US010146806B2

(12) United States Patent
Pemberton et al.

(10) Patent No.: US 10,146,806 B2
(45) Date of Patent: Dec. 4, 2018

(54) ADAPTIVE RESOLUTION HSITOGRAM

(71) Applicant: ORACLE INTERNATIONAL CORPORATION, Redwood Shores, CA (US)

(72) Inventors: Nathan Pemberton, Berkeley, CA (US); Vikas Aggarwal, Redwood City, CA (US); Sam Idicula, Santa Clara, CA (US); Nipun Agarwal, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 781 days.

(21) Appl. No.: 14/621,204

(22) Filed: Feb. 12, 2015

(65) Prior Publication Data
US 2016/0239528 A1    Aug. 18, 2016

(51) Int. Cl.
G06F 17/30    (2006.01)
(52) U.S. Cl.
CPC .. *G06F 17/30289* (2013.01); *G06F 17/30292* (2013.01); *G06F 17/30536* (2013.01)
(58) Field of Classification Search
CPC ......... G06F 17/30289; G06F 17/30292; G06F 17/30536
USPC .... 707/797, 741, 742, 758, 759, 764, 999.1, 707/999.006, 999.101, 999.102, E17.012
See application file for complete search history.

(56) References Cited

U.S. PATENT DOCUMENTS

| 7,043,494 | B1 * | 5/2006 | Joshi | G06F 17/30961 |
| 8,762,362 | B1 * | 6/2014 | Sathe | G06F 17/30961 |
| | | | | 707/706 |
| 2004/0243553 | A1 * | 12/2004 | Bailey | G06F 17/30961 |
| 2007/0156842 | A1 * | 7/2007 | Vermeulen | G06F 17/30212 |
| | | | | 709/217 |

(Continued)

OTHER PUBLICATIONS

Niloufar Shafiei, "Non-blocking Patricia Tries with Replace Operations", 2013 IEEE 33rd International Conference on Distributed Computing Systems Philadelphia, PA USA, Jul. 8, 2013 to Jul. 11, 2013, pp. 216-225.*

(Continued)

*Primary Examiner* — Jeff A Burke
*Assistant Examiner* — Kamal K Dewan
(74) *Attorney, Agent, or Firm* — Hickman Palermo Becker Bingham LLP

(57) ABSTRACT

A method, apparatus, and system for determining a data distribution is provided by using an adaptive resolution histogram. In an embodiment, the adaptive resolution histogram is created using a trie, wherein node values in the trie represent frequency distributions and node positions define associated keys or key prefixes. Keys are derived from input data such as database records that are streamed from a record source. These keys may be processed as received to build the trie in parallel with the production of the input data. To provide adaptive resolution, new child nodes may only be created in the trie when a node value is incremented beyond a predetermined threshold. In this manner, the histogram adjusts the allocation of nodes according to the actual distribution of the data. The completed adaptive resolution histogram may be used for various tasks such as partitioning for balanced parallel processing of the input data.

16 Claims, 8 Drawing Sheets

(56) References Cited

U.S. PATENT DOCUMENTS

| | | | | |
|---|---|---|---|---|
| 2008/0114765 A1* | 5/2008 | Asai | .......................... | G06F 7/24 |
| 2011/0128960 A1* | 6/2011 | Bando | ................... | H04L 45/745 |
| | | | | 370/392 |
| 2012/0047181 A1* | 2/2012 | Baudel | .............. | G06F 17/30327 |
| | | | | 707/797 |
| 2013/0294450 A1* | 11/2013 | Wang | ................... | H04L 45/748 |
| | | | | 370/392 |
| 2014/0201474 A1* | 7/2014 | Kirazci | ............. | G06F 17/30961 |
| | | | | 711/154 |

OTHER PUBLICATIONS

Piatetsky-Shapiro et al., "Accurate Estimation of the Number of Tuples Satisfying a Condition", dated 1984, ACM, 21 pages.

Kim et al., "CloudRAMSort: Fast and Efficient Large-Scale Distributed RAM Sort on Shared-Nothing Cluster", SIGMOD '12, May 20-24, 2012, Scottsdale, Arizona, USA, 10 pages.

Jimenez-Gonzalez et al., "Communication Conscious Radix Sort", dated 1998, CEPBA, 18 pages.

Ioannidis et al, "Balancing Histogram Optimality and Practicality for Query Result Size Estimation", SIGMOD, dated 1995, San Jose, 12 pages.

Gao et al., "A Variable Bin Width Histogram based Image Clustering Algorithm", 2010 IEEE 4th International Conference on Semantic Computing, 6 pages.

Blelloch et al., "A Comparison of Sorting Algorithms for the Connection Machine CM-2", dated 1991, ACM, 14 pages.

Rodiger et al, "Flow-Join: Adaptive Skew Handling for Distributed Joins over High-Speed Networks", dated May 2016, 12 pages.

Lu et al., "AdaptDB: Adaptive Partitioning for Distributed Joins", Proceedings of the VLDB Endowment, vol. 10, No. 5 Copyright 2017, 12 pages.

Bruno et al., "Advanced Join Strategies for LargeScale Distributed Computation", Proceedings of the VLDB Endowment, vol. 7, No. 13, Copyright 2014, 12 pages.

* cited by examiner

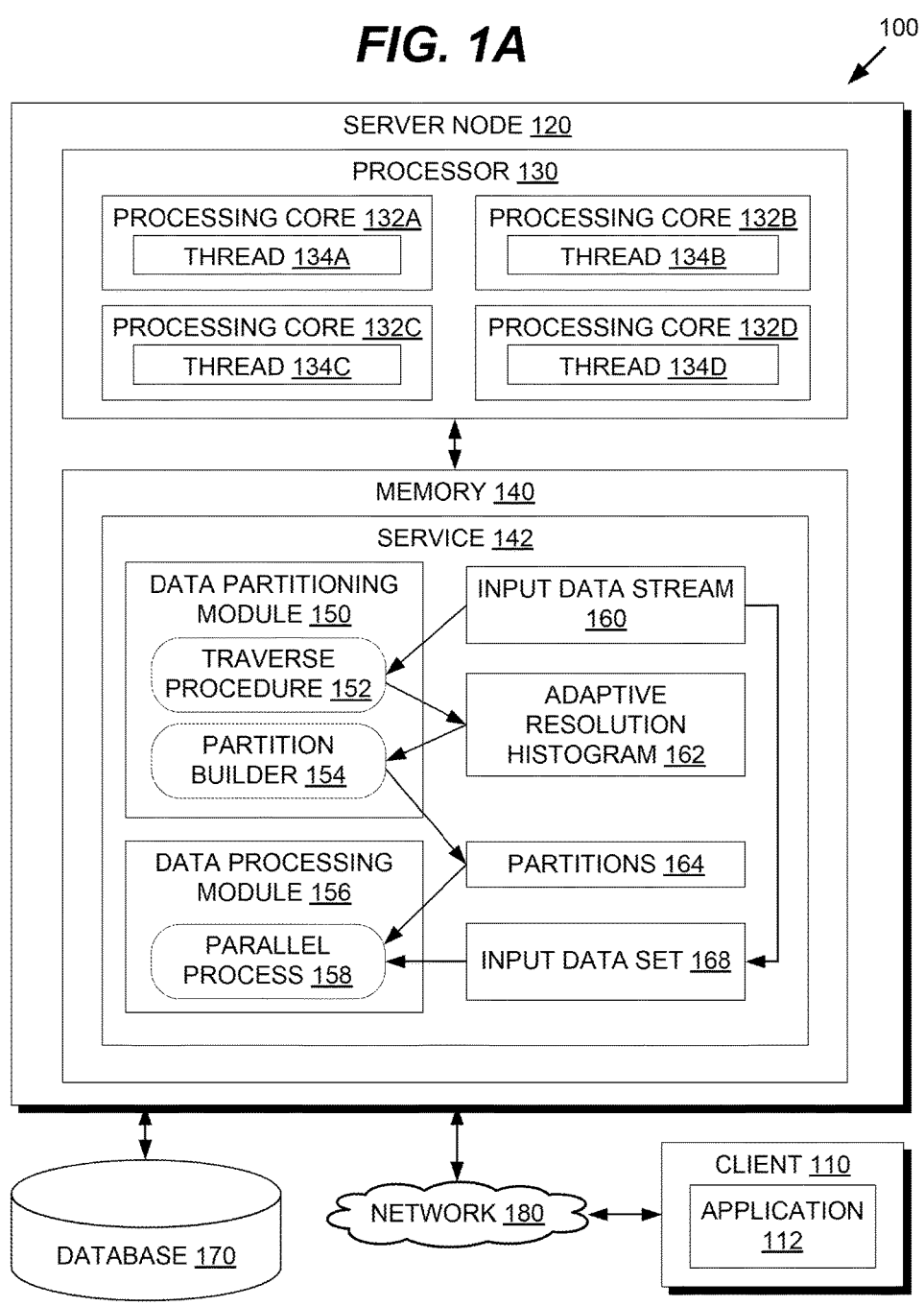

202
RECEIVE A PLURALITY OF KEYS OF A FIRST DATA TYPE HAVING N ELEMENTS OF A SECOND DATA TYPE

204
CREATE A TRIE AND ADDING A ROOT NODE, WHEREIN NODES ADDED TO THE TRIE ARE INITIALIZED TO A VALUE OF ZERO

206
DEFINE A TRAVERSE PROCEDURE TO PROCESS AN INPUT KEY AT AN INPUT NODE OF THE TRIE, WHEREIN THE TRAVERSE PROCEDURE INCREMENTS A VALUE OF ONE OR MORE NODES, TRAVERSED ACCORDING TO THE INPUT KEY, UNTIL REACHING A LEAF NODE COMPRISING AT LEAST ONE OF A BOTTOM NODE AT A MAXIMUM DEPTH CORRESPONDING TO N AND A HALT NODE WITH A VALUE NOT EXCEEDING A PREDETERMINED THRESHOLD VALUE, WHEREIN A NEW CHILD NODE IS ADDED TO THE TRIE ONLY WHEN THE VALUE OF A PARTICULAR NODE IS INCREMENTED BEYOND THE PREDETERMINED THRESHOLD VALUE

208
EXECUTE THE TRAVERSE PROCEDURE TO PROCESS EACH OF THE PLURALITY OF KEYS AT THE ROOT NODE OF THE TRIE

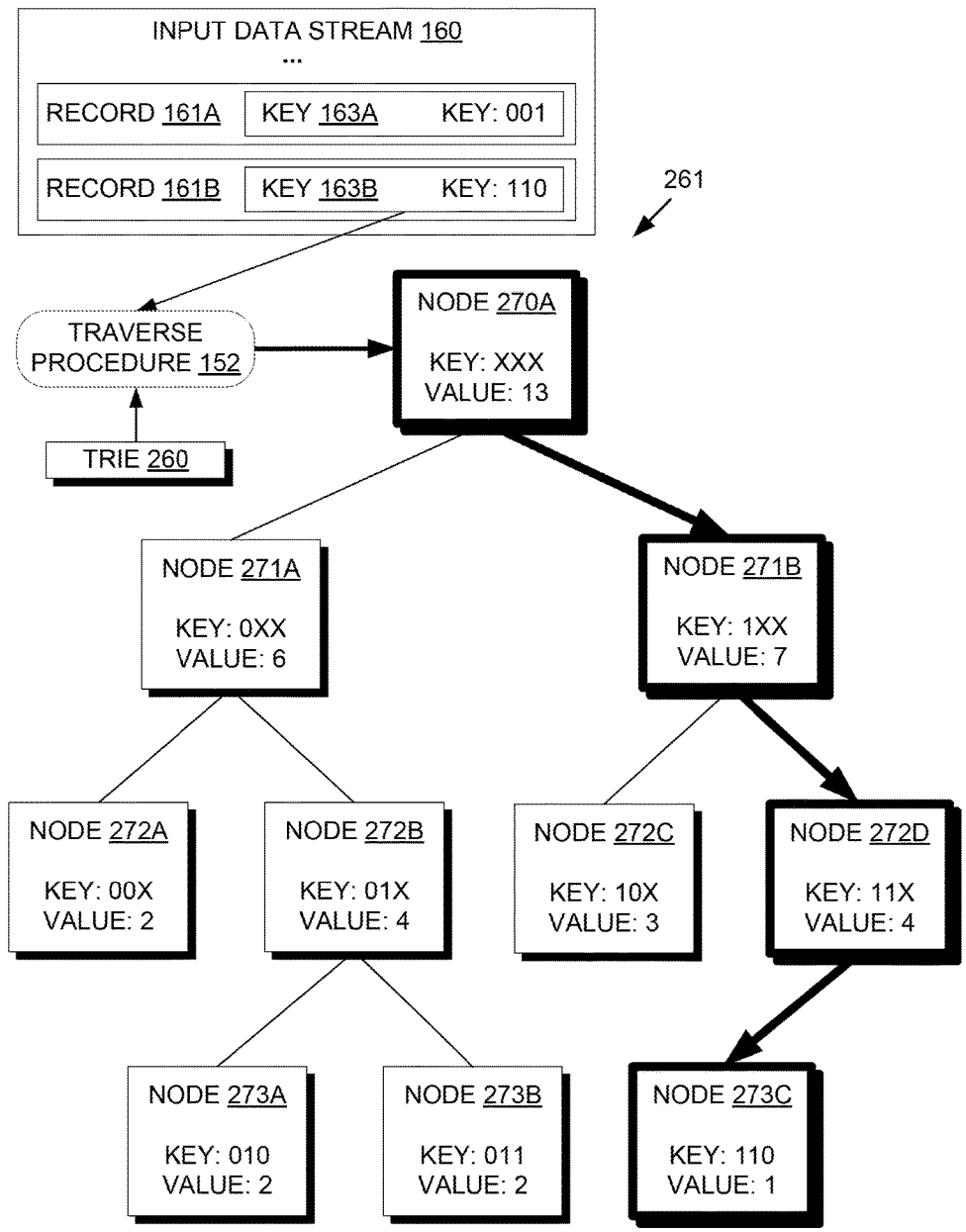

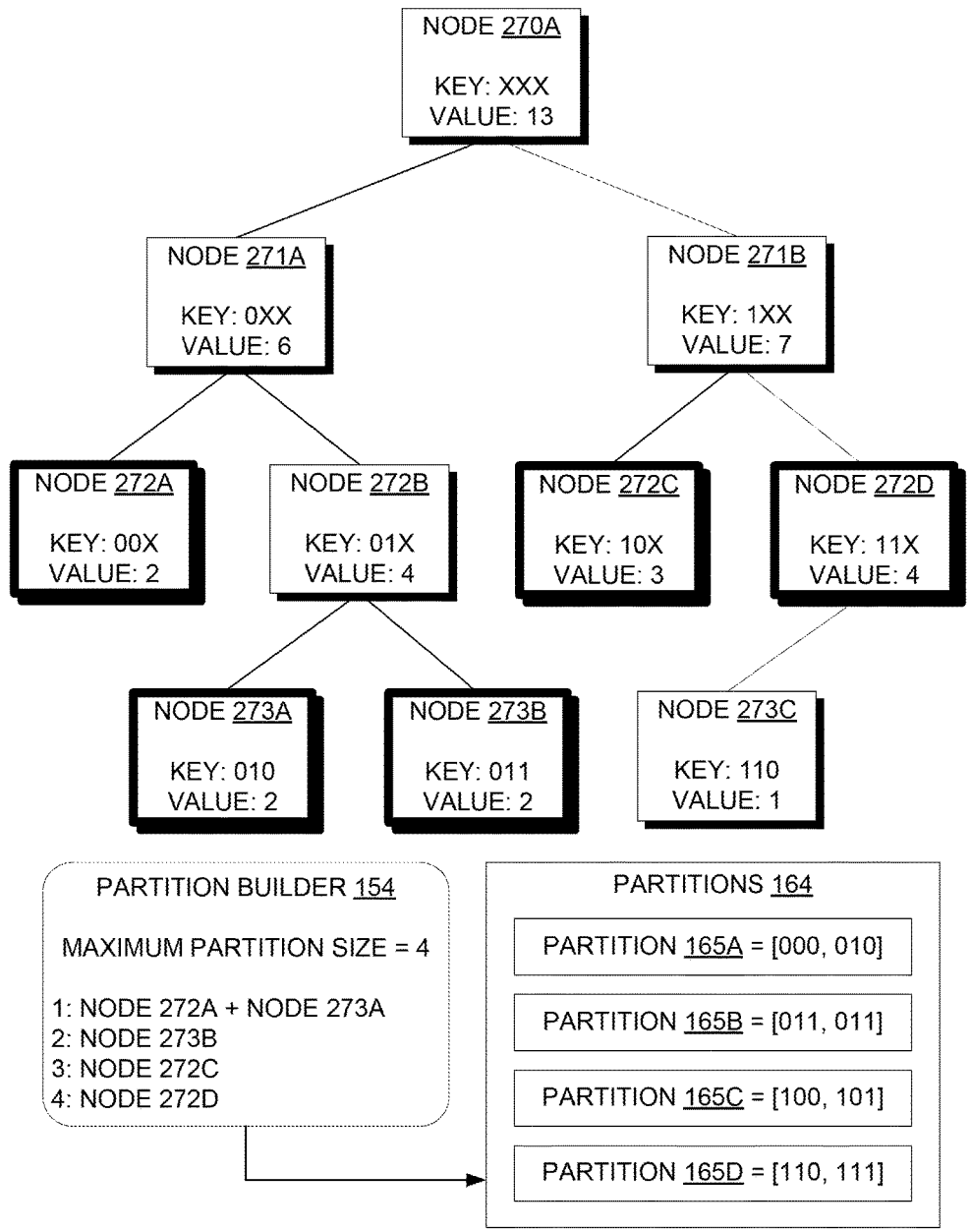

ADAPTIVE RESOLUTION HSITOGRAM

FIELD OF THE INVENTION

The present disclosure relates to data analysis, and more specifically, to determining a data distribution by using an adaptive resolution histogram, with particular application for big data sets having non-uniform or skewed data distributions.

BACKGROUND

Determining a data distribution has practical application for a wide variety of fields. One such application is data partitioning, wherein a data distribution is determined to divide data into data partitions, or non-overlapping subsets, for efficient parallel processing or for other tasks. The independent ranges of each data partition minimizes the need for synchronization and concurrency control mechanisms, helping to reduce overhead during parallel processing. Additionally, if the input data can be divided into approximately equally sized or balanced data partitions, better load balancing can be achieved across various parallel processing resources, such as server nodes and processor cores. Further, if the partition sizes can be limited to meet particular hardware specifications, for example processor cache sizes or available memory, then the parallel processing can be accelerated further by avoiding cache misses or disk swapping. In some cases, a hard partition size limit may be a functional requirement, such as for in-memory processing nodes.

In the context of enterprise databases, high performance computing (HPC), and other data intensive applications, scaling is most readily achieved by interconnecting resources such as processor cores and server nodes. Database operations such as table joining, sorting, aggregation, and other tasks can utilize data partitioning to evenly distribute the processing workloads to processing threads running on the available resources. In this manner, each processing thread can process their assigned workload in a non-blocking manner to finish at approximately the same time, optimizing performance and minimizing waits for threads to finish. Accordingly, a quick and accurate determination of a data distribution has particular application in the field of databases and for other computing fields that require scaling to a large number of resources.

Challenges arise when the input data to be processed is a big data set, for example when the input data includes billions or more records. In this case, approaches that require access to the entire input data at once to determine the data distribution, such as sorting the input data, may be impractical. Sampling techniques have been proposed, which allows analysis to proceed with only a smaller sample of the input data as a whole. For example, a histogram may be generated for only a sample of the input data, with data partitions created based on the histogram. However, to produce a histogram that accurately represents the input data as a whole, the sample must be sufficiently large. Thus, even sampling techniques may be impractical for big data sets, since the minimum size for an effective sample grows in tandem with the size of the input data.

Additionally, the input data to be analyzed may potentially include any kind of data distribution. For ideal load balancing, the determination of the data distribution should be sufficiently granular to enable the creation of approximately evenly sized data partitions. If the input data is non-uniform with high skew, a histogram may only provide coarse data distribution information. Sufficient granularity may be provided by using a large number of partitions, but this approach may impose an unacceptably high processing and resource burden, especially for input data that exhibits skew over a large dynamic range.

Based on the foregoing, there is a need for a method to efficiently determine a data distribution for big data sets having potentially high skew.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram that depicts an example system for determining a data distribution by building an adaptive resolution histogram, according to an embodiment;

FIG. 2A is a block diagram that depicts a process for determining a data distribution by building a trie representation of an adaptive resolution histogram, according to an embodiment;

FIG. 2D is a block diagram that depicts the trie representation of FIG. 2C being processed for an input key, according to an embodiment;

FIG. 2E is a block diagram that depicts a process of determining data partitions of a maximal size from a trie representation of an adaptive resolution histogram, according to an embodiment;

DETAILED DESCRIPTION

Figure 1B:
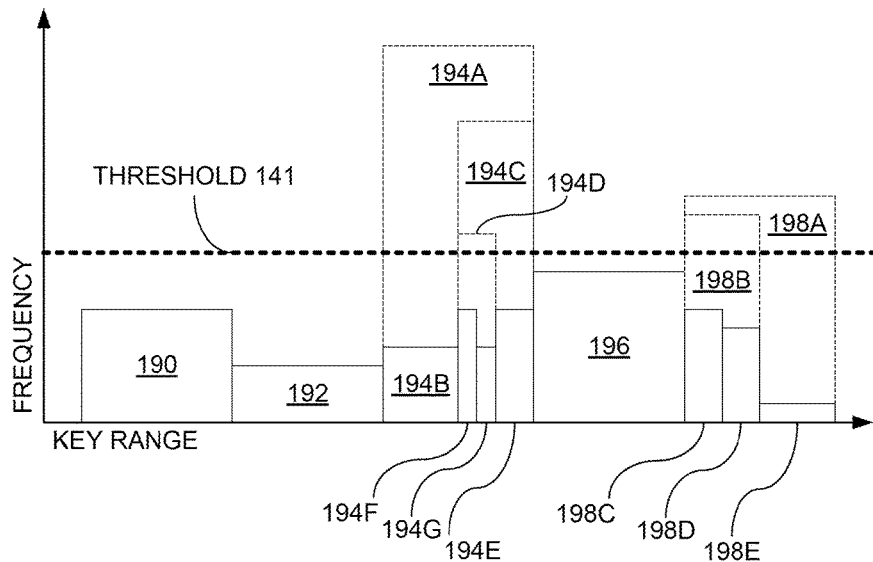
FIG. 1B is a block diagram that depicts an example adaptive resolution histogram for describing a data distribution, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, an improved method for determining a data distribution is provided by using an adaptive resolution histogram. Keys are streamed from input data to build an adaptive resolution histogram that represents a data distribution of the input data. In an embodiment, the adaptive resolution histogram is created using a trie, wherein node values in the trie represent frequency distributions, and node positions within the trie define the associated keys (for nodes at the maximum depth) or key prefixes (for nodes above the maximum depth). A maximum depth of the trie is based on a data type of the keys and data elements within the data type.

To provide adaptive resolution, the trie may initially only include a root node or nodes down to a certain depth in the trie. When a key is processed by traversing the trie according to the key and incrementing the value of traversed nodes, additional child nodes may only be added when a value is incremented beyond a predetermined threshold. In this manner, the histogram remains coarse with fewer nodes for sparse key ranges, but becomes increasingly granular with more nodes for high-frequency key ranges.

After being built, the adaptive resolution histogram may be used for data analysis, resource allocation, predictive optimization, data partition building, or for other tasks. For example, if the adaptive resolution histogram is represented by a trie, then nodes of the trie may be combined using a depth first traversal to create data partitions or data splitters of a desired target size. Once the data partitions are created, the input data may be distributed according to the data partitions for parallel processing across multiple resources, such as processor cores and server nodes.

This improved approach for determining a data distribution by using an adaptive resolution histogram provides several technical advantages. First, the adaptive resolution histogram can be built while streaming keys from an input data source. This enables high performance in a parallel, multi-threaded environment, since the computational cost of building the adaptive resolution histogram can be subsumed by other concurrent tasks, such as the generating of the input data itself. Other approaches such as sort-based approaches may only work serially, blocking progress until the entire data set is available. Initial tests have demonstrated that the adaptive resolution histogram can provide a 2.5× to 5× performance improvement when compared to sorting approaches. Second, the adaptive resolution histogram only consumes memory as necessary to provide sufficient data resolution according to the specific distribution of the input data and the desired threshold value. By minimizing memory footprint in this fashion, the adaptive resolution histogram is especially suited for analyzing big data sets. Third, because the adaptive resolution histogram can process the actual input data rather than a sample, the adaptive resolution histogram can provide a more accurate distribution for the entire data set. Since the histogram provides higher resolution for key ranges with greater frequency distributions, more useful distribution data is also provided. This may be especially important for data sets with significant skew, as the skew may not be accurately captured by using sample based approaches. Accordingly, this method for determining a data distribution by using an adaptive resolution histogram has particular relevance for applications that need to process big data sets having non-uniform or skewed data distributions.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data Manipulation Language ("DML") statements are SQL statements that retrieve or manipulate data in tables. DML statements are the most frequently used SQL statements. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and database blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Adaptive Resolution Histogram System Overview

FIG. 1A is a block diagram that depicts an example system for improved parallel data sorting, according to an embodiment. System 100 of FIG. 1A includes client 110, server node 120, database 170, and network 180. Client 110 includes application 112. Server node 120 includes processor 130 and memory 140. Processor 130 includes processing core 132A, processing core 132B, processing core 132C, and processing core 132D. Processing core 132A includes thread 134A, processing core 132B includes thread 134B, processing core 132C includes thread 134C, and processing core 132D includes thread 134D. Memory 140 includes service 142. Service 142 includes data partitioning module 150, data processing module 156, input data stream 160, adaptive resolution histogram 162, partitions 164, and input data set 168. Data partitioning module 150 includes traverse procedure 152 and partition builder 154. Data processing module 156 includes parallel process 158.

To support data intensive applications with large numbers of records and transactions, server node 120 utilizes a multi-core architecture to execute multiple threads concurrently, thereby reducing latency times and increasing data processing throughput. While only a single processor 130 and four processing cores 132A-132D are shown in FIG. 1A, embodiments may include any number of processors and processing cores, numbering in the hundreds or more. Processing cores 132A-132D may be independent physical or logical cores that are capable of executing respective threads 134A-134D concurrently. Additionally, while only a single server node 120 and a single client 110 are shown in FIG. 1A, embodiments may include multiple server nodes and/or multiple clients. Further, while system 100 is shown in the context of networked client-server architecture, system 100 may be flexibly configured according to specific application requirements. For example, in the context of system-on-a-chip or embedded applications, client 110 and server node 120 may be combined into a single monolithic device. For simplicity, it may be assumed that memory 140 is large enough to contain the entirety of service 142 to avoid any disk swapping I/O overhead.

In an embodiment, system 100 may be used in the context of databases. However, system 100 is not necessarily limited to database contexts and service 142 may correspond to any application or service that requires a determination of a data distribution. In the context of databases, server node 120 may correspond to a database server with service 142 corresponding to a DBMS for database 170, enabling client applications such as application 112 to interact with database 170. Accordingly, application 112 may send a DML statement to service 142 over network 180. In an embodiment, this DML statement may correspond to a SQL SELECT query that includes an ORDER BY sorting clause. However, application 112 may also send other DML statements that utilize table joins, aggregation, or other parallelizable operations.

When service 142 receives the database query from application 112, service 142 may form a query execution plan to carry out the SELECT query that retrieves the requested database records from database 170. As part of the query execution plan, any operators with parallelizable workloads may be first processed through data partitioning module 150 to generate a data distribution, or adaptive resolution histogram 162, of input data for the operator, or input data set 168. A stream of records is provided from input data stream 160, corresponding to input data set 168 as it is streamed from a record source, or database 170. Keys are extracted and processed from input data stream 160 as received to build adaptive resolution histogram 162 using traverse procedure 152. This provides a key performance advantage when input data set 168 is a big data set that may contain billions or more elements, since traverse procedure 152 can build adaptive resolution histogram 162 in parallel as keys are extracted from input data stream 160, avoiding a busy wait for input data set 168 to fully populate.

As discussed above, adaptive resolution histogram 162 may be used for various tasks, but in the example shown in FIG. 1A, adaptive resolution histogram 162 is used by partition builder 154 to generate partitions 164 for appropriately dividing the workload of processing input data set 168 to available processing resources. For example, if the available processing resources include threads 134A-134D, then partition builder 154 may build four (4) partitions with key ranges that represent approximately evenly sized workloads. In another example, if the workloads are to be processed in-memory on multiple server nodes, then partitions may be built according to size limitations corresponding to the available memory of the multiple server nodes. In another example, partitions may be sized according to the processing speed and loading level of the available processing resources. Thus, partition builder 154 can flexibly generate partitions 164 according to various priorities including load balancing, memory constraints, efficient resource utilization, and other factors.

Once partitions 164 have been determined, data processing module 156 may carry out the processing of the operator, which is accelerated using parallel process 158. As discussed above, the example DML statement is a SQL SELECT query with an ORDER BY clause. Thus, one of the operators of the query execution plan may be a sorting operator, in which case parallel process 158 would correspond to a parallel sort. For example, if partitions 164 divides input data set 168 into four (4) approximately equal workloads, then the portions of input data set 168 defined by partitions 164 may be sorted by parallel process 158 executing on respective threads 134A-134D. Since each of threads 134A-134D operates on independent non-overlapping portions of input data set 168 in memory 140, concurrency issues such as write contention and overhead from inter-process communication are bypassed.

In embodiments with multiple server nodes, data processing module 156 may distribute data portions to threads on remote nodes (not shown in FIG. 1A) via network 180. The remote nodes may correspond to multi-core server nodes similar to server node 120. After the remote nodes complete their portion of parallel process 158, then the remote results may be returned over network 180 to be combined with local results. After data processing module 156 completes, then any other remaining steps of the query execution plan may be completed, with parallelizable operators processed in a similar manner, and the final result may be returned to the requesting application 112.

Adaptive Resolution Histogram

To provide a visual demonstration of the advantages provided by the adaptive resolution histogram, FIG. 1B illustrates a block diagram that depicts an example adaptive resolution histogram for describing a data distribution, according to an embodiment. Adaptive resolution histogram 162 of FIG. 1B includes threshold 141 and interval 190, interval 192, interval 194A, interval 194B, interval 194C, interval 194D, interval 194E, interval 194F, interval 194G, interval 196, interval 198A, interval 198B, interval 198C, interval 198D, and interval 198E. With respect to FIG. 1B, adaptive resolution histogram 162 may correspond to adaptive resolution histogram 162 from FIG. 1A.

As shown in FIG. 1B, the histogram may also be viewed as a histogram with equal size intervals by focusing only on intervals 190, 192, 194A, 196, and 198A. For purposes of example, it may be assumed that each of these intervals cover an adjacent, non-overlapping range of 1024 key values, wherein the key values are integers. Thus, interval 190 may correspond to [0, 1023], interval 192 may correspond to [1024, 2047], interval 194A may correspond to [2048, 3071], interval 196 may correspond to [3072, 4095], and interval 198A may correspond to [4096, 5119]. Each interval indicates on the Y axis the frequency or the number of keys that fall within its range. Additional intervals may be present that are not specifically shown in FIG. 1B.

With only equal size intervals, the data distribution is fairly coarse, failing to provide a detailed breakdown of intervals with high frequency, such as interval 194A. Thus, as shown in FIG. 1B, a threshold is determined, or threshold 141. If any of the intervals exceed this threshold 141 when the adaptive resolution histogram 162 is being built, then the interval is divided into sub-intervals as necessary. Intervals that are divided are represented using dashed outlines in FIG. 1B. Threshold 141 may be adjusted higher to reduce processing and resource footprint, or lower to increase the overall resolution of adaptive resolution histogram 162. Additionally, threshold 141 may be based on specific hardware limits such as memory or processor cache sizes.

For example, focusing on interval 194A, it can be seen that interval 194A exceeds threshold 141 and therefore interval 194A is divided into intervals 194B and 194C. Interval 194C also exceeds threshold 141 and therefore interval 194C is further divided into intervals 194D and 194E. Interval 194D also exceeds threshold 141 and therefore interval 194D is further divided into intervals 194F and 194G. After all of this dividing, the remaining intervals with solid outlines are the four (4) intervals 194B, 194F, 194G, and 194E, covering the respective key ranges of [3072, 3583], [3584, 3711], [3712, 3839], and [3840, 4095]. These intervals provide a more granular picture of the data distribution within interval 194A. In a similar manner, interval 198A is divided into intervals 198C, 198D, and 198E. Thus, adaptive resolution histogram 162 includes ten (10) variable sized intervals after dividing, or intervals 190, 192, 194B, 194F, 194G, 194E, 196, 198C, 198D, and 198E.

Note that while the divisions each create two sub-intervals in the examples shown in FIG. 1B, this is due to the assumption that the keys are comprised of data elements corresponding to single bits. In other embodiments, the intervals may be divided up to the appropriate number of sub-intervals, for example 16 sub-intervals when the keys are comprised of data elements corresponding to 4-bit nibbles. Note that some sub-intervals may not be created at all, as those sub-intervals may never receive any key values from traverse procedure 152.

Figure 1C:
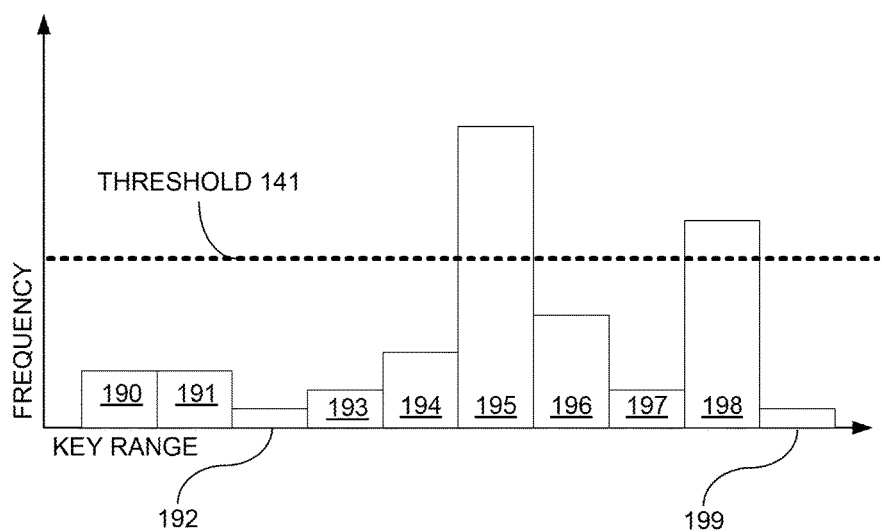
FIG. 1C is a block diagram that depicts an example fixed interval histogram for describing the same data distribution of FIG. 1B.

To illustrate the comparative advantages of adaptive resolution histogram 162, FIG. 1C illustrates a block diagram that depicts an example fixed interval histogram for describing the same data distribution of FIG. 1B. For the sake of comparing the same memory footprint, histogram 163 of FIG. 1C uses the same number of intervals as adaptive resolution histogram 162, or 10 intervals: interval 190, interval 191, interval 192, interval 193, interval 194, interval 195, interval 196, interval 197, interval 198, and interval 199. Additionally, intervals 190-199 cover the same aggregate key range as the intervals of FIG. 1B. While the same threshold 141 from FIG. 1B is shown in FIG. 1C for illustrative purposes, threshold 141 is not used to generate histogram 163.

Since histogram 163 of FIG. 1C uses fixed sized intervals across the entire range of possible key values, only a single interval 195 is available to describe the distribution of keys within the range of [2560, 3071]. On the other hand, the adaptive resolution histogram 162 of FIG. 1B includes three intervals, or intervals 194F, 194G, and 194E, to describe the distribution of keys within the same aggregate range of [2560, 3071]. Thus, adaptive resolution histogram 162 is able to provide distribution detail where it is most needed: intervals with the highest frequency of keys.

Fixed size intervals may only perform well in limited circumstances, for example when the data distribution is relatively uniform across its entire dynamic range. However, when the data distribution is skewed and keys tend to cluster around specific ranges, or within interval 195 as shown in FIG. 1C, then fixed size intervals may fail to provide sufficient data distribution detail where it is most needed. A greater dynamic range in the key values also requires an attendant increase in the number of fixed size intervals to provide sufficient data resolution. As a result, a significant portion of memory may be wastefully allocated for sparse or empty intervals while still failing to provide sufficient data distribution granularity.

On the other hand, adaptive resolution histogram 162 only creates intervals as necessary according to the keys that are received and the predetermined threshold value. As a result, the structure of adaptive resolution histogram 162 provides intervals that are sized appropriately to provide detail where it is needed while avoiding the wasteful allocation of empty intervals. Thus, adaptive resolution histogram 162 can flexibly adapt to any non-uniform or skewed data distribution across any dynamic range while consuming a minimal memory footprint.

Adaptive Resolution Histogram Building Process

With a basic outline of system 100 now in place, it may be instructive to review a high level overview of the processing steps carried out by data partitioning module 150. Turning to FIG. 2A, FIG. 2A is a block diagram that depicts a process for determining a data distribution by building a trie representation of an adaptive resolution histogram, according to an embodiment.

Receiving Keys

At block 202 of process 200, referring to FIG. 1A, server node 120 receives a plurality of keys of a first data type having N elements of a second data type. For example, in the database context illustrated in FIG. 1A, input data stream 160 may correspond to database records as they are retrieved from database 170. Keys may be retrieved from the database records as they are streamed from input data stream 160. Alternatively, the entire set of records to be processed may be available, for example as input data set 168. In this case, the plurality of keys can be read at once from input data set 168.

The plurality of keys received in block 202 may include fields from one or more database columns of the database records, or even a function or expression derived from the database records. For example, as discussed above, service 142 may process a SQL SELECT query with an ORDER by clause, in which case the ORDER by clause may be used to determine the plurality of keys in block 202. In another embodiment, the keys may correspond to a defined sort key for a record source table in a database query. In yet another embodiment, the keys may correspond to other key values, such as primary key values.

In one example, the plurality of keys may correspond to 64 bit integer values. In this case, the first data type corresponds to a 64 bit integer. The second data type can therefore correspond to a grouping of bits, such as 1 (a bit), 4 (a nibble), or 8 (a byte). Thus, the first data type may include N=64 bits, or N=16 nibbles, or N=8 bytes. In another example, the sort key may correspond to a fixed length string, wherein the first data type is a fixed length string of 20 characters, and wherein the second data type is a character of 8 bits. In this case, N=20 chars.

Creating the Trie

At block 204 of process 200, referring to FIG. 1A, server node 120 creates a trie and adds a root node, wherein nodes added to the trie are initialized to a value of zero. Thus, the trie initially only contains a root node with a value of zero. In some embodiments, the trie may be pre-populated with a certain number of nodes. For example, the upper levels of the trie may be pre-populated with nodes initialized to zero values. After the completion of process 200, the trie will represent a distribution of values for the plurality of keys received in block 202. Accordingly, the trie created in block 204 may correspond to adaptive resolution histogram 162 in FIG. 1A.

Note that the data types of the keys received from block 202 defines the maximum possible depth for the trie. Thus, if the example of a 64 bit integer with 64 1-bit elements is used, then the trie would have a maximum possible depth of N=64, with each node having at most 2^1 or 2 child nodes. If the example of a 64 bit integer with 16 4-bit nibbles is used, then the trie would have a maximum possible depth of 16, but each node may have at most 2^4 or 16 child nodes since the second data type is a 4-bit nibble having 24^4 or 16 possible values.

Defining the Traverse Procedure

At block 206 of process 200, referring to FIG. 1A, server node 120 defines a traverse procedure 152 to process an input key at an input node. Traverse procedure 152 may be defined as part of data partitioning module 150, which may be loaded into memory 140 when service 142 is started. Traverse procedure 152 traverses one or more nodes of the trie, or adaptive resolution histogram 162, according to the input key, starting from the input node and incrementing the value of each node that is traversed. The traversal continues until a leaf node is reached, which comprises at least one of a halt node and a bottom node. A halt node is a node whose value does not exceed a predetermined threshold value. A bottom node is a node at the maximum possible depth of N. If the traversal increments a halt node that is not a bottom node, then the input key is only partially processed and the traversal ends early after incrementing the halt node. If the traversal increments a bottom node, then the input key is completely processed and the traversal ends after incrementing the bottom node. An example implementation of block 206 is provided in FIG. 2B, as discussed below. While traverse procedure 152 is described recursively in FIG. 2B, other embodiments may use iteration or other approaches.

Traverse procedure 152 only creates a new child node when a value is incremented beyond the predetermined threshold value. Recall that block 204 only creates a trie with a root node or with nodes to a certain depth. Thus, the trie or adaptive resolution histogram 162 is initially sparse, and nodes are only created as necessary to accommodate the actual key values that are received. In this manner, adaptive resolution is provided by successively dividing high frequency key ranges, or nodes that exceed the threshold value, into smaller, more granular key ranges.

Executing the Traverse Procedure on the Keys

At block 208 of process 200, referring to FIG. 1A, server node 120 executes traverse procedure 152 to process each of the plurality of keys from block 202 at the root of the trie created in block 204. Thus, each of the keys extracted from input data stream 160 may be input into the traverse procedure of traverse procedure 152, which in turn processes the keys to update adaptive resolution histogram 162. Note that because traverse procedure 152 can process the keys from input data stream 160 as the records are received from database 170, traverse procedure 152 does not need to wait until the entire input data set 168 is made available before processing. Thus, adaptive resolution histogram 162 can be built by processing keys that are streamed from a record source, allowing blocks 202 and 208 to execute concurrently in parallel, pipelined fashion. Of course, if only the complete input data set 168 is available, for example if input data set 168 is transferred from a different server node, then traverse procedure 152 can also process all of the keys at once from input data set 168.

Example Trie

Figure 2B:
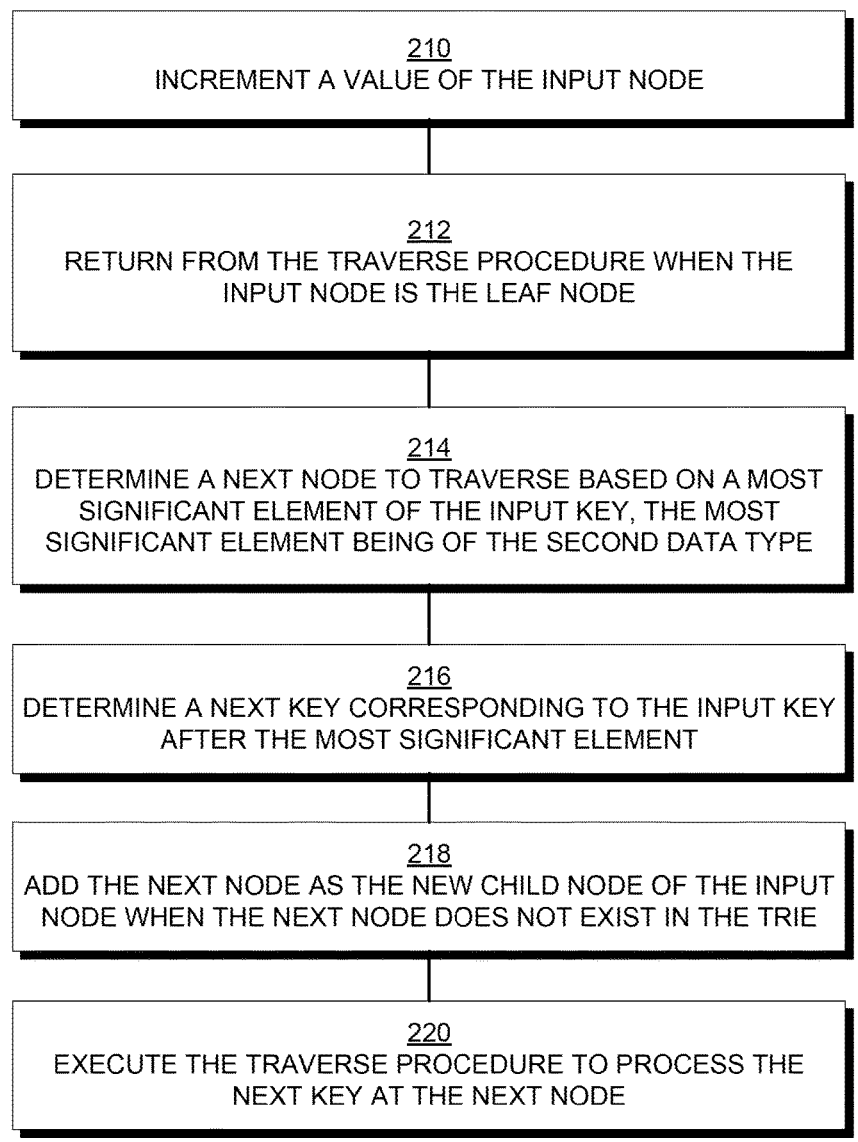
FIG. 2B is a block diagram that depicts a process for a traverse procedure to process an input key at an input node of a trie, according to an embodiment.
Figure 2C:
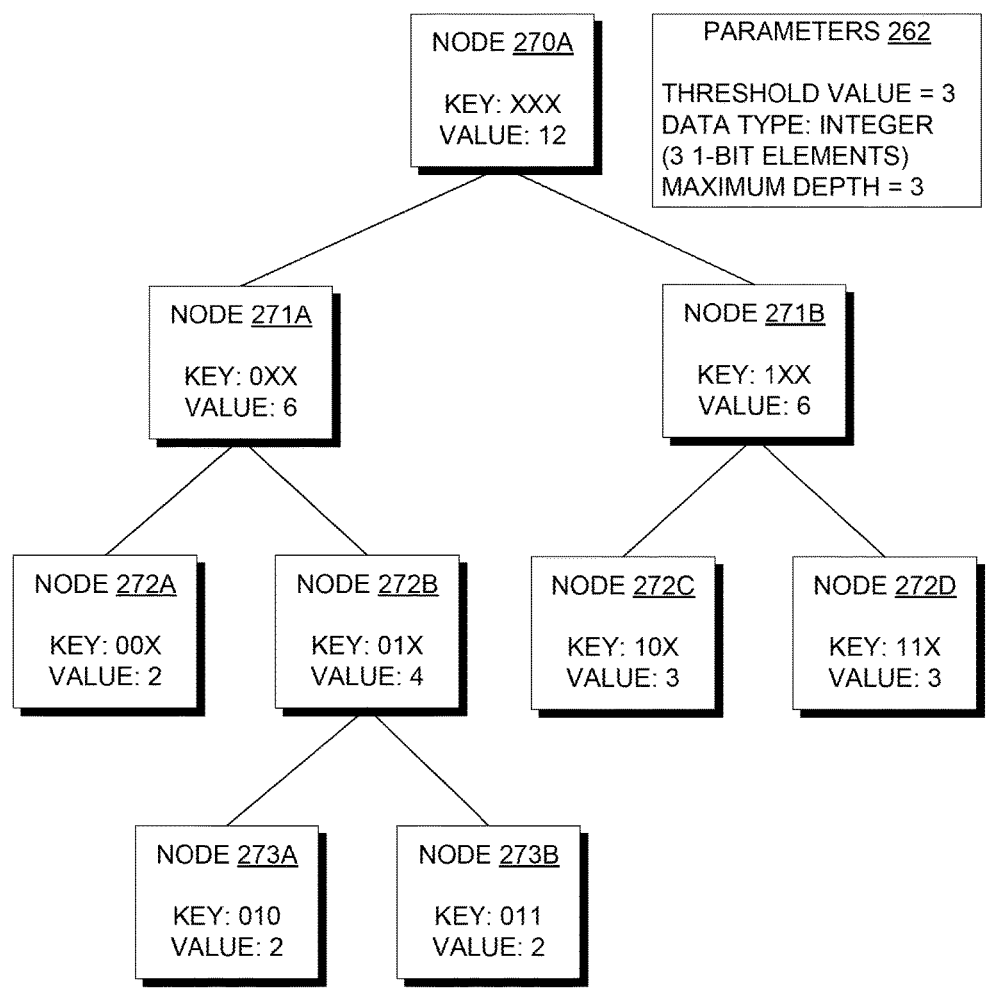
FIG. 2C is a block diagram that depicts a trie representation of an adaptive resolution histogram, according to an embodiment.

To assist in demonstrating the processing of block 206 as described in FIG. 2B, it would be helpful to first provide an example populated trie structure. FIG. 2C is a block diagram that depicts a trie representation of an adaptive resolution histogram, according to an embodiment. As shown in FIG. 2C, traverse procedure 152 may have already been executed for 12 keys (the value of root node 270A) to build trie 260 as shown, which includes node 270A, node 271A, node 271B, node 272A, node 272B, node 272C, node 272D, node 273A, and node 273B. With respect to FIG. 2C, trie 260 may correspond to adaptive resolution histogram 162 in FIG. 1A.

Each node in trie 260 indicates an associated key prefix followed by an "X" for each "do not care element," or element that can be anything. Each node also indicates a value that represents the frequency of keys under the subtree that has that node as the root. Additionally, parameters 262 specifies the predetermined threshold value to use for dividing nodes (THRESHOLD VALUE=3) and the data type of the keys received in block 202 (integer having 3 1-bit elements for a MAXIMUM DEPTH=3). Note that for explanatory purposes, the key is sized very small at 3 1-bit elements, but any data type, any number of data elements, and any type of data element may be utilized for the keys.

As shown in FIG. 2C, the nodes that have a value that exceeds the predetermined threshold are nodes that have been divided by adding children nodes. These nodes include node 270A (12>3), node 271A (6>3), node 271B (6>3), and node 272B (4>3). The remaining nodes are leaf nodes that have values that do not exceed the predetermined threshold, including node 272A (2<=3), node 273A (2<=3), node 273B (2<=3), node 272C (3<=3), and node 272D (3<=3). Note that no child nodes can be added to the bottom nodes at the maximum depth, or nodes 273A and 273B, even if their values exceed the predetermined threshold.

Initial Execution of the Traverse Procedure

With an overview of process 200 now in place and an example trie 260 for reference, a more detailed examination of an example implementation of block 206 may be instructive. Turning to FIG. 2B, FIG. 2B is a block diagram that depicts a process for a traverse procedure to process an input key at an input node of a trie. With respect to FIG. 2B, process 209 may correspond to block 206 from FIG. 2A.

Assuming that process 209 is executed as part of process 200 from FIG. 2A and using the example trie 260 from FIG. 2C, the input node may correspond to the root of trie 260, and the input key may correspond to one of the plurality of keys received from input data stream 160 in block 202. Turning then to FIG. 2D, FIG. 2D is a block diagram that depicts trie 260 being processed by traverse procedure 152 for key 163B, according to an embodiment. After the processing of key 163B, the state of trie 260 is updated to trie 261, as explained in detail below. As shown in FIG. 2D, trie 261 includes all of the nodes of trie 260 from FIG. 2C, including node 270A, node 271A, node 271B, node 272A, node 272B, node 272C, node 272D, node 273A, and node 273B. Additionally, trie 261 also includes a newly added node 272C. With respect to FIG. 2D, like numbered elements may correspond to the same elements from FIG. 2C and FIG. 1A.

As shown in FIG. 2D, input data stream 160 may include one or more records, or records 161A and 161B, which each have an associated key, or key 163A and key 163B respectively. Note that while keys 163A-163B are shown as being embedded in records 161A-161B, the keys 163A-163B may also comprise external expressions or functions that rely on data fields within the records, and thus keys 163A-163B may be dynamically generated instead of being stored as static record fields. For the purposes of example, traverse procedure 152 specifically processes key 163B as the input key, or "110".

Returning then to process 209, at block 210 of process 209, referring to FIG. 2C and FIG. 2D, traverse procedure 152 increments a value of the input node, or the root node of trie 260. Thus, the value of node 270A is incremented from 12 to 13, as shown in trie 261.

At block 212 of process 209, referring to FIG. 2C and FIG. 2D, traverse procedure 152 returns when the input node is the leaf node. Since node 270A is at a depth of 0 and since the value of node 270A is above the predetermined threshold of 3, node 270A is neither a bottom node nor a halt node. Since node 270A is therefore not a leaf node, execution of traverse procedure 152 resumes.

At block 214 of process 209, referring to FIG. 2C and FIG. 2D, traverse procedure 152 determines a next node to traverse based on a most significant element of the input key. In this case, since key 163B corresponds to "110" and the second data type is a single bit as defined in parameters 262, the most significant element corresponds to the most significant bit, or the leftmost bit "1". Accordingly, the next node is 271B, or the branch corresponding to bit "1". If the bit was "0" instead, then the next node would instead be 271A, or the branch corresponding to bit "0". Thus, the number of possible branches at each node depends on the second data type used to define the keys, with a single bit defining 2 branches, a 4-bit nibble defining 16 branches, a 8-bit byte defining 256 branches, and so forth.

At block 216 of process 209, referring to FIG. 2C and FIG. 2D, traverse procedure 152 determines a next key corresponding to the input key after the most significant element. As discussed above in block 214, the most significant element is the most significant bit or leftmost bit "1" of the key "110". Thus, the next key is the remaining two bits after the leftmost bit, or "10".

At block 218 of process 209, referring to FIG. 2C and FIG. 2D, traverse procedure 152 adds the next node as the new child node of the input node when the next node does not exist in the trie. However, as shown in FIG. 2C, the next node 271B already exists in trie 270, and therefore does not need to be added into trie 271.

At block 220 of process 209, referring to FIG. 2C and FIG. 2D, traverse procedure 152 executes traverse procedure 152 to process the next key at the next node. Thus, process 209 is executed recursively, but at the next node 271B for the next key "10". As discussed above, while process 209 is described in a recursive form for explanatory purposes, alternative embodiments may use iteration or other methods for performance or other reasons.

Successive Executions of the Traverse Procedure

Successive executions of traverse procedure 152 operate in a similar manner as described above. As shown in FIG. 2D, a second execution of traverse procedure 152 increments the value of node 271B from 6 to 7 and determines the next node to be node 272D, since the leftmost bit of "10" is "1". Thus, the next key is the remaining bit, or "0".

A third execution of traverse procedure 152 increments the value of node 272D from 3 to 4 and determines the next node to be node 273C, since the leftmost bit of "0" is "0". However, since node 273C does not exist in trie 260 as shown in FIG. 2D, the node 273C is added as the new child node of node 272D, as shown in FIG. 2D. Since newly added nodes are initialized to a value of zero, node 273C initially has a value of zero. The next key is empty, since no bits remain.

A fourth execution of traverse procedure 152 increments the value of node 273C from 0 to 1. Since node 273C is a leaf node that is both a bottom node (depth=3) and a halt node (value <=3), the fourth execution stops early and returns after block 212, unwinding the stack and completing the initial execution of traverse procedure 152.

Executing the Traverse Procedure for the Plurality of Keys

The above described process was specifically applied for key 163B as the input key; however, as described in block 208, traverse procedure 152 is executed for each of the plurality of keys received in block 202, or all the keys derived from input data stream 160. Note that while all the bits of key 163B or "110" were fully processed in the example shown in FIG. 2D, some of the other keys in the plurality of keys may only be partially processed, depending on whether a halt node is encountered during traversal.

For example, if key 163B was instead "000", then only the first two bits of the key or "00" would be processed, since node 272A would be traversed as a halt node. More specifically, even after incrementing the value of node 272A from 2 to 3, the value of node 272A still remains within the predetermined threshold (3<=3), and therefore the execution of traverse procedure 152 would return early. As a result, key ranges with low frequency will receive fewer child nodes and therefore less detail, whereas key ranges with high frequency will receive more child nodes and therefore greater detail.

After all of the keys are processed from input data stream 160, trie 261 corresponds to a data structure that represents adaptive resolution histogram 162. While the actual data in trie 261 may differ from the data distribution used in FIG. 1B, the graphical appearance of adaptive resolution histogram 162 based on trie 261 may appear similar to the graphical representation shown in FIG. 1B. As discussed above, adaptive resolution histogram 162 can be used for a wide variety of applications, but the particular application here will be parallel processing, or using adaptive resolution histogram 162 to form appropriately sized data partitions for processing input data set 168.

Building Data Partitions

Thus, once adaptive resolution histogram 162 is fully populated after block 208, partition builder 154 may proceed to create partitions 164 for dividing input data set 168 into data partitions, or non-overlapping subsets for parallel processing. Referring to FIG. 2E, FIG. 2E is a block diagram that depicts a process of determining data partitions from a trie representation of an adaptive resolution histogram, according to an embodiment. FIG. 2E includes trie 261, partition builder 154, and partitions 164. Partitions 164 include partition 165A, partition 165B, partition 165C, and partition 165D. Trie 261 in FIG. 2E includes the same nodes as trie 261 from FIG. 2D, or node 270A, node 271A, node 271B, node 272A, node 272B, node 272C, node 272D, node 273A, node 273B, and node 273C. With respect to FIG. 2E, like numbered elements may correspond to the same elements from FIG. 2D and FIG. 1A.

In the case of server node 120 in FIG. 1A, the available parallel processing resources are threads 134A-134D, or four threads. Thus, it is desirable to create four approximately equally sized partitions 165A-165D within partitions 164 to split the workload of parallel process 158 on input data set 168 in a load balanced fashion across threads 134A-134D. Since the total number of keys is known by examining the value of the root node of trie 261, or 13 total keys, a target partition size can be readily ascertained. Dividing 13 keys by 4 threads results in 3.25 keys per thread, which is rounded up to 4 whole keys. Thus, the target partition size can be set to 4, as shown in partition builder 154. Of course, this is only one example method of determining the target partition size, and any desired method may be used. While in this particular example the threshold value (3) and the target partition size (4) are numerically close to each other, in a more typical configuration with a large number of keys, the threshold value will generally be much smaller than the target partition size.

Once the target partition size is known, partition builder 154 can proceed to traverse trie 261 to generate partitions 164. A modified depth first traversal of the trie can be executed to determine node groups each having a total value according to the target partition size. More specifically, the modified depth first traversal truncates search paths if an entire subtree can be included within a node group or candidate group, and the traversal continues through the trie until all of the nodes have been covered and included into node groups, either directly or indirectly by being included in a subtree. Once the node groups are known, the aggregate key ranges of each node group correspond directly to the partition boundaries of the individual partitions in partitions 164. The nodes that are included for the node groups are shown bolded in FIG. 2E. Note that when an included node is a subtree, such as node 272D, the modified depth first traversal can include only the root of the subtree and truncate the search path for that subtree. Thus, there is no need to traverse the subtree of node 272D and node 273C can be skipped entirely.

In one implementation, a partition builder procedure may be defined wherein a candidate group is initialized with no nodes, wherein a running total of the values of the nodes in the candidate group is maintained. A modified depth first traversal of trie 261 is initiated, examining each traversed node as a candidate node and marking the candidate node as traversed. A determination is made at each candidate node whether to include or exclude the candidate node from the candidate group. In the case where the candidate node is a subtree, the candidate node is included if the running total remains within the target partition size when the candidate node is included, or if $R+V<=T$, wherein R corresponds to the current running total, V corresponds to the candidate node value, and T corresponds to the target partition size. The entire subtree is also marked as traversed. Otherwise, if $R+V>T$, then the subtree is excluded and the modified depth first traversal continues.

In the case where the candidate node is a leaf node, the candidate node is included when the running total would be brought closer to the target partition size. For example, let $|T-(R+V)|$ correspond to a first quantity and let $|T-R|$ correspond to a second quantity, wherein || stands for absolute value. If the first quantity is less than the second quantity, then the running total would be brought closer to the target partition size when including the node. If the first quantity is more than the second quantity, then the running total would be brought farther from the target partition size when including the node. If the first quantity is equal to the second quantity, then the distance to the target partition size is the same whether the candidate node is included or excluded. In this case, an arbitrary decision can be made to include or exclude the candidate node. In the examples discussed herein, the decision is made to exclude the candidate node when the two quantities are equal. In other words, if $|T-(R+V)|<|T-R|$, then include the candidate node; otherwise, if $|T-(R+V)|>=|T-R|$, then exclude the candidate node.

Once the running total cannot be brought any closer to the target partition size, then the candidate group should be finalized. This will be the case when the running total equals or exceed the target partition size ($R>=T$), or when a candidate node that is a leaf node is excluded. Once the candidate group is finalized, a partition is built with range boundaries defined by the aggregate key ranges of the nodes in the candidate group. The candidate group is emptied or a new candidate group is created, and the modified depth first traversal continues with the next candidate node to build the next partition. The modified depth first traversal continues to build the remaining partitions until all nodes of trie 261 have been marked as traversed.

Partitions with the Same Key Value

Note that a special case may need to be considered when the input data exhibits significant skew. For example, if the input data is associated with a large number of duplicate keys, then a single leaf node may have a value that exceeds the target partition size. In this case, multiple adjacent partitions may be assigned to the same key value. Later, when partitions 164 are used to divide input data set 168 in parallel process 158, then a round robin distribution, hash, or another method may be used to distribute into the multiple adjacent partitions when the same key value is encountered in input data set 168.

Target Versus Maximum Partition Size

The above implementation assumes that it is permissible for a partition to exceed the target partition size, since the constraint is only to provide approximately balanced workloads for the available threads. In other embodiments, it may be desirable to set a hard size limit for each partition, for example to optimize according to memory size, cache size, or other constraints. In this case, the target partition size may also be a maximum partition size, and the determination to include a candidate node that is a leaf node may be based on whether the running total is within the maximum partition size when the candidate node is included, or if R+V<=T. If R+V>T, then the candidate node should be excluded, and the candidate group should be finalized as above. Note that in this case, both leaf nodes and subtrees are evaluated using the same decision criteria.

Depth First Traversal to Build the Partitions

To demonstrate the building of partitions 164 by partition builder 154, a depth first traversal of trie 261 will be demonstrated using the example partition builder procedure discussed above. A description of the traversal for the first partition 165A is presented in Table 1 below:

TABLE 1

Depth first traversal to build partition
165A with a maximum partition size T = 4

| CANDIDATE NODE | NODE VALUE (V) | CANDIDATE GROUP | RUNNING TOTAL (R) | DECISION (R + V <= or > T) |
|---|---|---|---|---|
| Node 270A (subtree) | 13 | (empty) | 0 | Exclude (13 > 4) |
| Node 271A (subtree) | 6 | (empty) | 0 | Exclude (6 > 4) |
| Node 272A (leaf) | 2 | (empty) | 0 | Include (2 <= 4) |
| Node 272B (subtree) | 4 | (272A) | 2 | Exclude (6 > 4) |
| Node 273A (leaf) | 2 | (272A) | 2 | Include (4 <= 4) |
| Node 273B (leaf) | 2 | (272A, 273A) | 4 | Exclude (6 > 4) |

Note that in the example traversal in Table 1, partition builder 154 is configured for a "maximum partition size". Thus, the decision whether to include or exclude a candidate node is the same for subtrees as for leaf nodes, or whether R+V<=T (include) or R+V>T (exclude). After node 273B is reached, the candidate group is finalized (since R>=T, or 4>=4) and partition 165A is built based on the nodes within the candidate group, or nodes 272A and 273A as indicated in candidate group 1 shown in partition builder 154. Since node 272A corresponds to the key "00X", wherein X is a "do not care element", node 272A corresponds to the keys "000" and "001". Node 273A corresponds to the key "010". Thus, the aggregate key range corresponds to [000, 010], as shown in partition 165A. Continuing, a description of the traversal for the second partition 165B is presented in Table 2 below:

TABLE 2

Depth first traversal to build partition 165B
with a maximum partition size T = 4

| CANDIDATE NODE | NODE VALUE (V) | CANDIDATE GROUP | RUNNING TOTAL (R) | DECISION (R + V <= or > T) |
|---|---|---|---|---|
| Node 273B (leaf) | 2 | (empty) | 0 | Include (2 <= 4) |

TABLE 2-continued

Depth first traversal to build partition 165B
with a maximum partition size T = 4

| CANDIDATE NODE | NODE VALUE (V) | CANDIDATE GROUP | RUNNING TOTAL (R) | DECISION (R + V <= or > T) |
|---|---|---|---|---|
| Node 271B (subtree) | 7 | (273B) | 2 | Exclude (9 > 4) |
| Node 272C (leaf) | 3 | (273B) | 2 | Exclude (5 > 4) |

As shown in Table 2, the traversal for partition 165B is finalized after reaching node 272C (since R>=T, or 5>=4). The modified depth first traversal may then resume to build the remaining partitions 165C-165D as shown in FIG. 2E. Accordingly, candidate group 2 (node 273B) corresponds to partition 165B with a range of [011, 011], candidate group 3 (node 272C) corresponds to partition 165C with a range of [100, 101], and candidate group 4 (node 272D) corresponds to partition 165D with a range of [110, 111]. Thus, partitions can be built by repeatedly grouping leaf nodes and/or subtrees in a modified depth first traversal until a maximum partition size is reached.

In an alternative embodiment, the modified depth first traversal may create partitions using a target partition size, wherein the partition sizes are allowed to exceed the target partition size. For example, when partition builder 154 is configured for a target partition size of 4, the traversal for partition 165B may proceed instead as shown in Table 3 below:

TABLE 3

Depth first traversal to build a
partition with a target partition size T = 4

| CANDIDATE NODE | NODE VALUE (V) | CANDIDATE GROUP | (R) | DECISION |
|---|---|---|---|---|
| Node 273B (leaf) | 2 | (empty) | 0 | Include (2 < 4) |
| | | | | \|T − (R + V)\| < or >= \|T − R\| |
| | | | | \|4 − (0 + 2)\| < or >= \|4 − 0\| |
| Node 271B (subtree) | 7 | (273B) | 2 | Exclude (9 > 4) |
| | | | | R + V <= or > T |
| Node 272C (leaf) | 3 | (273B) | 2 | Include (1 < 2) |
| | | | | \|T − (R + V)\| < or >= \|T − R\| |
| | | | | \|4 − (3 + 2)\| < or >= \|4 − 2\| |
| Node 272D (subtree) | 4 | (273B, 272C) | 5 | Exclude (9 > 4) |
| | | | | R + V <= or > T |

As shown in Table 3, the decision whether to include or exclude a candidate node may depend on whether the candidate node is a subtree or a leaf node. After reaching node 272D, candidate group 2 is finalized (since R>=T, or 5>=4), which includes nodes 273B and 272C. After resuming the modified depth first traversal, a candidate group 3 is finalized including node 272D. Accordingly, in this example, candidate group 1 (node 272A and 273A) corresponds to a partition with a range of [000, 010], candidate group 2 (node 273B and 272C) corresponds to a partition with a range of [011, 101], and candidate group 3 (node 272D) corresponds to a partition with a range of [110, 111]. While in this example only 3 partitions are created when 4 partitions were intended, a typical configuration where the target partition size is much larger than the threshold value will be more likely generate the intended number of partitions.

Parallel Processing Using the Partitions

Once partitions 164 are built by partition builder 154, then data processing module 156 in FIG. 1A may commence with parallel process 158. Input data set 168 is divided according to partitions 164 for parallel processing on available resources. In the case of FIG. 1A, referring to FIG. 2E, threads 134A-134D may be assigned to sort the records in input data set 168 that match the key ranges defined by respective partitions 165A-165D. Since the partitions created by partition builder 154 are non-overlapping, threads 134A-134D are enabled to operate on independent portions of input data set 168 for optimal parallelism without burdensome concurrency controls. Once parallel process 158 is complete, the sorted portions from threads 134A-134D may be combined and passed down to any further operators that may exist in the query execution plan, thereby responding to the original SQL SELECT query from application 112.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
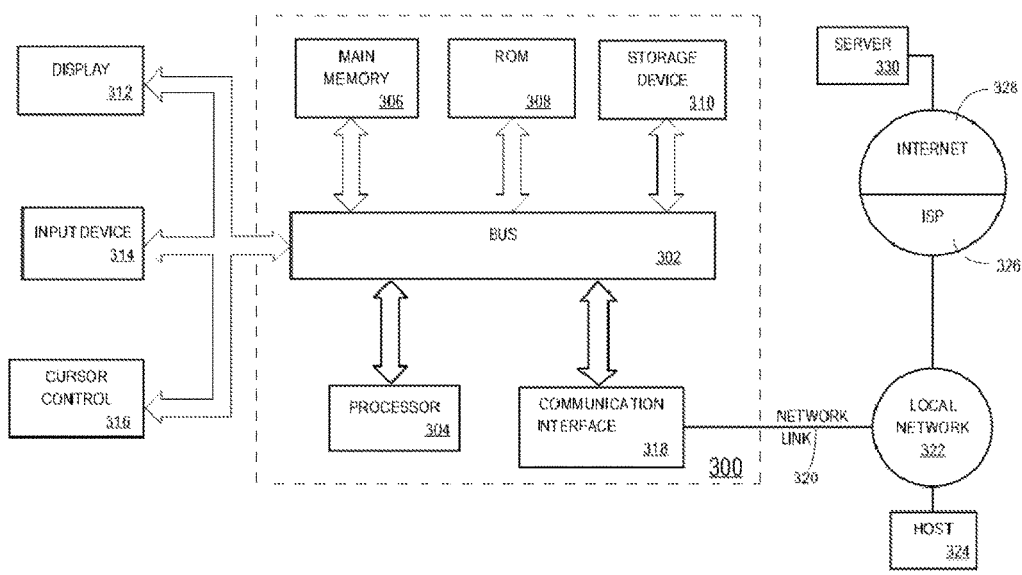
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a plurality of keys from a particular body of data;
wherein each key of the plurality of keys comprises a plurality of elements;
populating a trie, which comprises nodes corresponding to values of elements of the plurality of keys, to produce a populated trie;
wherein populating the trie comprises, as each given key of the plurality of keys is received, incrementing a count value of a node of the trie that corresponds to at least a subset of the plurality of elements of the given key;
while populating the trie:
determining that a particular count value of a particular node of the trie exceeds a predetermined threshold value,
wherein the particular node of the trie is located at a depth that is less than a maximum depth of the nodes of the trie, and
in response to determining that the particular count value of the particular node of the trie exceeds the predetermined threshold value, adding one or more child nodes to the particular node in the trie; and
determining a plurality of data partitions, for the particular body of data,
based on traversal of the populated trie comprising:
assigning, to a particular data partition of the plurality of data partitions, one or more nodes of the trie,
wherein at least one node, of the one or more nodes, represents a subtree of the trie,
wherein the subtree of the trie comprises two or more nodes of the trie, and
wherein, for each given data partition of the plurality of data partitions, the respective one or more nodes assigned to the given data partition define a range of keys, from the particular body of data, that fall within the given data partition;
wherein the method is performed by one or more computing devices.

2. The method of claim 1, wherein:
populating the trie further comprises, as each given key of the plurality of keys is received, incrementing respective count values of one or more particular nodes, other than a given node of the trie that corresponds to said at least a subset of the plurality of elements of the given key;
said one or more particular nodes are in a path between the given node of the trie and a root of the trie, inclusive.

3. The method of claim 1, wherein, for each given data partition of the plurality of data partitions, the one or more nodes assigned to the given data partition collectively represent a total count value according to a target partition size.

4. The method of claim 3, wherein the target partition size is a maximum partition size.

5. The method of claim 3, wherein the traversal of the populated trie is a modified depth first traversal that truncates a search path, of the subtree of the at least one node in the trie, based on the at least one node both (a) representing a subtree of the trie and (b) being assigned to a data partition of the plurality of data partitions.

6. The method of claim 1, wherein the plurality of keys is derived from a plurality of records streamed from the particular body of data.

7. The method of claim 1, wherein the receiving of the plurality of keys and the populating the trie are performed in parallel.

8. One or more non-transitory computer-readable media storing one or more sequences of instructions which, when executed by one or more processors, cause:
receiving a plurality of keys from a particular body of data;
wherein each key of the plurality of keys comprises a plurality of elements;

populating a trie, which comprises nodes corresponding to values of elements of the plurality of keys, to produce a populated trie;

wherein populating the trie comprises, as each given key of the plurality of keys is received, incrementing a count value of a node of the trie that corresponds to at least a subset of the plurality of elements of the given key; while populating the trie:

determining that a particular count value of a particular node of the trie exceeds a predetermined threshold value, wherein the particular node of the trie is located at a depth that is less than a maximum depth of the nodes of the trie, and in response to determining that the particular count value of the particular node of the trie exceeds the predetermined threshold value, adding one or more child nodes to the particular node in the trie; and determining a plurality of data partitions, for the particular body of data, based on traversal of the populated trie comprising:

assigning, to a particular data partition of the plurality of data partitions, one or more nodes of the trie, wherein at least one node, of the one or more nodes, represents a subtree of the trie, wherein the subtree of the trie comprises two or more nodes of the trie, and wherein, for each given data partition of the plurality of data partitions, the respective one or more nodes assigned to the given data partition define a range of keys, from the particular body of data, that fall within the given data partition.

9. The one or more non-transitory computer-readable media of claim 8, wherein:

populating the trie further comprises, as each given key of the plurality of keys is received, incrementing respective count values of one or more particular nodes, other than a given node of the trie that corresponds to said at least a subset of the plurality of elements of the given key;

said one or more particular nodes are in a path between the given node of the trie and a root of the trie, inclusive.

10. The one or more non-transitory computer-readable media of claim 8, wherein, for each given data partition of the plurality of data partitions, the one or more nodes assigned to the given data partition collectively represent a total count value according to a target partition size.

11. The one or more non-transitory computer-readable media of claim 10, wherein the target partition size is a maximum partition size.

12. The one or more non-transitory computer-readable media of claim 10, wherein the traversal of the populated trie is a modified depth first traversal that truncates a search path, of the subtree of the at least one node in the trie, based on the at least one node both (a) representing a subtree of the trie and (b) being assigned to a data partition of the plurality of data partitions.

13. The one or more non-transitory computer-readable media of claim 8, wherein the plurality of keys is derived from a plurality of records streamed from the particular body of data.

14. The one or more non-transitory computer-readable media of claim 8, wherein the receiving of the plurality of keys and the populating the trie are performed in parallel.

15. The method of claim 1, wherein two or more partitions of the plurality of data partitions are concurrently assigned a particular node representing a particular key of the plurality of keys.

16. The one or more non-transitory computer-readable media of claim 8, wherein two or more partitions of the plurality of data partitions are concurrently assigned a particular node representing a particular key of the plurality of keys.

\* \* \* \* \*

UNITED STATES PATENT AND TRADEMARK OFFICE
CERTIFICATE OF CORRECTION

PATENT NO. : 10,146,806 B2
APPLICATION NO. : 14/621204
DATED : December 4, 2018
INVENTOR(S) : Pemberton et al.

Page 1 of 1

It is certified that error appears in the above-identified patent and that said Letters Patent is hereby corrected as shown below:

On the Title Page

Column 1, under Title, Line 1, delete "HSITOGRAM" and insert -- HISTOGRAM --, therefor.

In the Specification

In Column 1, Line 1, delete "HSITOGRAM" and insert -- HISTOGRAM --, therefor.

In Column 9, Line 34, delete "24^4" and insert -- 2^4 --, therefor.

Signed and Sealed this
Third Day of December, 2019

Andrei Iancu
*Director of the United States Patent and Trademark Office*